United States Patent
Wang et al.

(10) Patent No.: US 12,207,384 B2
(45) Date of Patent: Jan. 21, 2025

(54) TOP SURFACE WAVE ANTENNA OF SPHERICAL TOKAMAK

(71) Applicant: Anhui Agricultural University, Hefei (CN)

(72) Inventors: Yaoyao Wang, Hefei (CN); Qing Zhou, Hefei (CN); Zhenxing Wang, Hefei (CN); Chengzhou Liu, Hefei (CN); Wendong Ma, Hefei (CN); Liang Zhu, Hefei (CN); Jiafang Shan, Hefei (CN)

(73) Assignee: Anhui Agricultural University, Hefei (CN)

( * ) Notice: Subject to any disclaimer, the term of this patent is extended or adjusted under 35 U.S.C. 154(b) by 244 days.

(21) Appl. No.: 18/056,741

(22) Filed: Nov. 18, 2022

(65) Prior Publication Data
US 2024/0030616 A1 Jan. 25, 2024

(30) Foreign Application Priority Data
Jul. 21, 2022 (CN) .......................... 202210863935.7

(51) Int. Cl.
*H05H 1/46* (2006.01)
*G21B 1/05* (2006.01)
(52) U.S. Cl.
CPC ............. *H05H 1/463* (2021.05); *G21B 1/057* (2013.01)

(58) Field of Classification Search
CPC ........ H05H 1/463; G21B 1/057; H01Q 13/28; H01Q 1/50; H01Q 1/12; H01Q 13/10; Y02E 30/10
See application file for complete search history.

(56) References Cited

FOREIGN PATENT DOCUMENTS

WO  WO-2014202739 A1 * 12/2014  ............. G21B 1/057

OTHER PUBLICATIONS

"Non-inductive plasma initiation and plasma current ramp-up on the TST-2 spherical tokamak" Nuclear Fusion, vol. 53, pp. 1-6, May 8, 2013 (Year: 2013).*

\* cited by examiner

*Primary Examiner* — Abdullah A Riyami
*Assistant Examiner* — Syed M Kaiser
(74) *Attorney, Agent, or Firm* — HoustonHogle LLP

(57) ABSTRACT

Disclosed is a top surface wave antenna of a spherical Tokamak, comprising a feedback waveguide, a brim, sub-waveguides, and a metal base. The lower end of the feed waveguide is connected to one end of the metal base, and one side of the feed waveguide is connected to the brim. The brim is towards a length direction of the metal base. A plurality of sub-waveguides are arranged on the metal base at equal intervals, the tops of the sub-waveguides are not higher than the height of the metal base, and the sub-waveguides are arranged in a rising line trend. The feed waveguide serves as a microwave input port. The top surface wave antenna of the spherical Tokamak is mainly used in a high-power Tokamak system and acts on the low-hybrid wave current driving together with an external antenna so as to obtain a better effect.

9 Claims, 4 Drawing Sheets

TOP SURFACE WAVE ANTENNA OF SPHERICAL TOKAMAK

CROSS-REFERENCE TO RELATED APPLICATION

This patent application claims the benefit and priority of Chinese Patent Application No. 202210863935.7, filed with the China National Intellectual Property Administration on Jul. 21, 2022, the disclosure of which is incorporated by reference herein in its entirety as part of the present application.

TECHNICAL FIELD

The present disclosure relates to the technical field of surface wave antennas, and in particular relates to a top surface wave antenna of a spherical Tokamak.

BACKGROUND

Low-hybrid wave current driving is one of the most effective Tokamak non-inductive current driving methods recognized. In the spherical Tokamak, antennas used in the low-hybrid wave current driving are divided into outer antennas and top antennas. A non-inductive plasma current starting experiment has been carried out on the Tokamak device using low power of an external antenna, obtaining a good and remarkable result. While the problem of density limit has made the researchers realize the inadequacy of peripheral antennas. Therefore, a top antenna needs to be designed to promote the absorption of power in the core region of the plasma.

SUMMARY

An objective of the present disclosure is to provide a top surface wave antenna of a spherical Tokamak to solve the problem of density limit involved in current driving of low-hybrid wave external antenna of a small Tokamak in the prior art, such that the surface wave antenna and a peripheral antenna are supplementary to each other. The surface wave antenna is stable in performance and good in testing result, and conforms to experimental requirements.

To achieve the objective, the present disclosure provides the following solutions:

A top surface wave antenna of a spherical Tokamak comprises a feedback waveguide, a brim, sub-waveguides, and a metal base. The lower end of the feed waveguide is connected to one end of the metal base, and one side of the feed waveguide is connected to the brim. The brim is towards a length direction of the metal base. A plurality of sub-waveguides are arranged on the metal base at equal intervals, the tops of the sub-waveguides are not higher than the height of the metal base, and the sub-waveguides are arranged in a rising line trend. The feed waveguide serves as a microwave input port.

Preferably, a through opening of the feed waveguide is rectangular, the top surface of the feed waveguide is flush with the top end of the metal base, and the initial height of the sub-waveguide is not higher than the bottom surface of the feed waveguide.

Preferably, the brim is an inverted U shape, the top surface of the brim is flush with the top surface of the feed waveguide, two side surfaces of the brim are right triangles, and the two side surfaces of the brim are connected to the side wall of the feed waveguide.

Preferably, two platforms and two sections of steps are arranged on the metal base, and a first platform, a first section of steps, a second platform and a second section of steps are connected in sequence. The sub-waveguides arranged on the first platform, the first section of steps and the second platform have the same height, and the top ends of the sub-waveguides on the second section of steps are flush with the top ends of the sub-waveguides on the second platform. Each step on the first section of steps and the second section of steps has a height of 0 mm to 100 mm, and radiation slots formed in the first platform, the first section of steps and the second platform each have a depth of 0 mm to 100 mm.

Preferably, each step of the first section of steps has a height of 3.38 mm, and each step of the second section of steps has a height of 5 mm.

Preferably, the radiation slot between the adjacent sub-waveguides has a width of 0 mm to 100 mm, and the radiation slots formed in the first platform, the first section of steps and the second platform each have a depth of 27 mm to 28 mm.

Preferably, the number of the sub-waveguides is 0 to 100, and the sub-waveguides each have a thickness of 0 mm to 100 mm and a height of 0 mm to 100 mm.

Preferably, the number of the sub-waveguide is 27, the sub-waveguides each have a thickness of 5 mm, and a spacing distance between the adjacent sub-waveguides is 5 mm.

Preferably, the total length of the feed waveguide and the metal base is not greater than 240 mm, and the top surface wave antenna has a parallel refractive index $n_{11}$ of 0 to 100.

Preferably, the feed waveguide, the brim, the sub-waveguide and the metal base are made of copper, aluminum, iron, or stainless steel.

Compared with the prior art, the present disclosure obtains the following technical effects:

The top surface wave antenna of the spherical Tokamak is mainly used in a high-power Tokamak system and acts on the low-hybrid wave current driving together with an external antenna so as to obtain a better effect. The sub-waveguides are arranged in a sawtooth manner and compact in structure. The top surface wave antenna is stable in performance, excellent in testing result, and conforms to experiment and machining requirements.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

Figure 1:
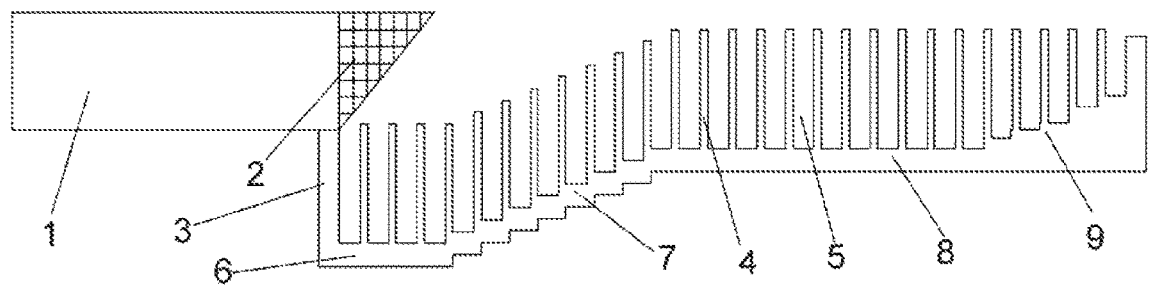
FIG. 1 is a first structure diagram of a top surface wave antenna of a spherical Tokamak in accordance with the present disclosure.
Figure 2:
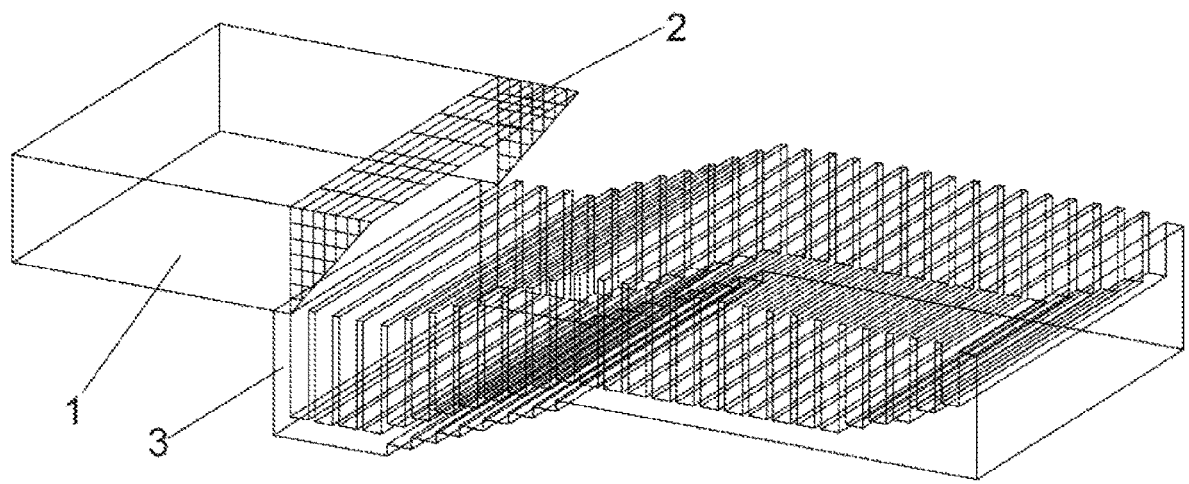
FIG. 2 is a second structure diagram of a top surface wave antenna of a spherical Tokamak in accordance with the present disclosure.
Figure 3:
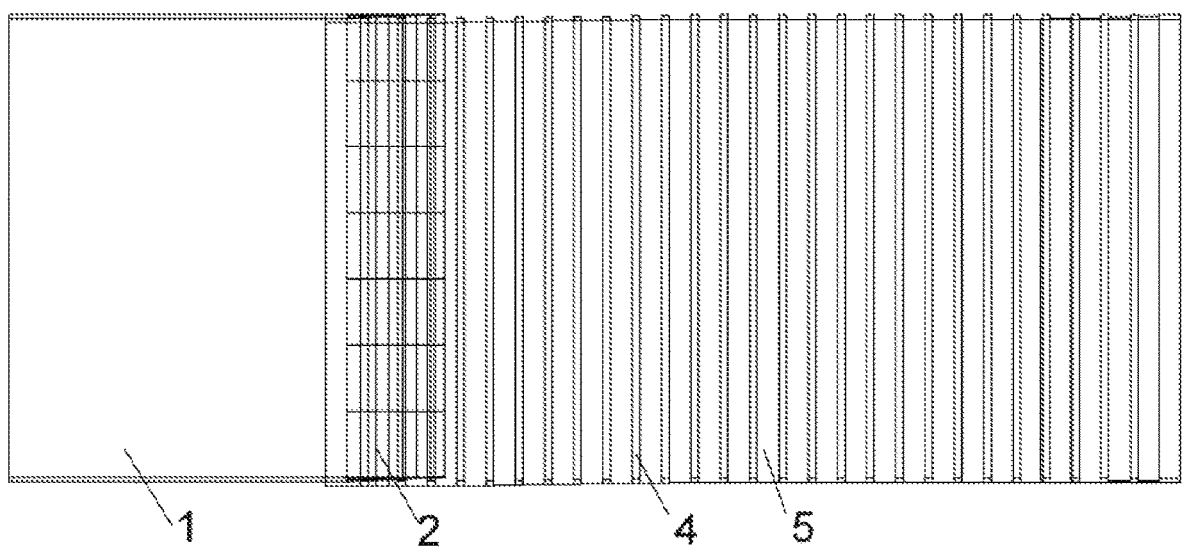
FIG. 3 is a third structure diagram of a top surface wave antenna of a spherical Tokamak in accordance with the present disclosure.

In the drawings: 1—feed waveguide; 2—brim; 3—metal base; 4—sub-waveguide; 5—radiation slot; 6—first platform; 7—first section of steps; 8—second platform; 9—second section of steps.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide a top surface wave antenna of a spherical Tokamak to solve the problem of density limit involved in current driving of low-hybrid wave external antenna of a small Tokamak in the prior art, such that the surface wave antenna and a peripheral antenna are supplementary to each other. The surface wave antenna is stable in performance and good in testing result, and conforms to experimental requirements.

To make the objectives, features and advantages of the present disclosure more apparently and understandably, the present disclosure is further described in detail with reference to accompanying drawings and specific embodiments.

As shown in FIG. 1 to FIG. 5, the embodiment provides a top surface wave antenna of a spherical Tokamak, comprising a feedback waveguide 1, a brim 2, sub-waveguides 4, and a metal base 3. The lower end of the feed waveguide 1 is connected to one end of the metal base 3, and one side of the feed waveguide is connected to the brim 2. The brim 2 is towards a length direction of the metal base 3. A plurality of sub-waveguides 4 are arranged on the metal base 3 at equal intervals, the tops of the sub-waveguides 4 are not higher than the height of the metal base 3, and the sub-waveguides 4 are arranged in a rising line trend. The feed waveguide 1 serves as a microwave input port.

A through opening of the feed waveguide 1 is rectangular and has only a left input port. Only a reflection coefficient needs to be focused during an experiment. The top surface of the feed waveguide 1 is flush with the top end of the metal base 3, and the initial height of the sub-waveguide 4 is not higher than the bottom surface of the feed waveguide 1. The brim 2 is an inverted U shape, the top surface of the brim 2 is flush with the top surface of the feed waveguide 1, the two side surfaces of the brim are right triangles, and the two side surfaces of the brim are connected to the side wall of the feed waveguide 1. The arrangement of the brim 2 is more conducive to the uniform conduction of the microwave.

Two platforms and two sections of steps are arranged on the metal base 3. A first platform 6, a first section of steps 7, a second platform 8 and a second section of steps 9 are connected in sequence. The sub-waveguides 4 arranged on the first platform 6, the first section of steps 7 and the second platform 8 have the same height, and the top ends of the sub-waveguides 4 on the second section of steps 9 are flush with the top ends of the sub-waveguides 4 on the second platform 8. Each step of the first section of steps 7 has a height of 3.38 mm, and each step of the second section of steps 9 has a height of 5 mm. The height of each step is not equal to the height of the sub-waveguide 4, and the thicknesses of the sub-waveguides 4 are consistent, such that the radiation performance of the antenna is better and more accurate. The arrangement of the steps is more conducive to the crawling of microwaves.

A radiation slot 5 between the adjacent sub-waveguides 4 has a width of 0 mm to 100 mm. The number of the sub-waveguides 4 is 0 to 100, and the sub-waveguides 4 each have a thickness of 0 mm to 100 mm and a height of 0 mm to 100 mm. According to the transmission line principle, the performance of the antenna and the setting of the reflection coefficient, the thickness and the number of the sub-waveguides 4 and the spacing distance between the adjacent sub-waveguides can be properly changed. In the embodiment, the number of the sub-waveguides 4 is 27, the number of the radiation slots 5 is 28, the radiation slots 5 formed in the first platform 6, the first section of steps 7 and the second platform 8 each have a depth of 0 to 100 mm, preferably 27 mm to 28 mm, the sub-waveguides 4 each have a thickness of 0 to 100 mm, preferably 5 mm, and a spacing distance between the adjacent sub-waveguides 4 is 0 to 100 mm, preferably 5 mm.

The total length of the feed waveguide 1 and the metal base 3 is not greater than 240 mm, and the top surface wave antenna has a parallel refractive index $n_{11}$ of 0 to 10. In accordance with the embodiment, the antenna has a dimension of 210 mm in a microwave transmission direction. Due to the fact that the top antenna needs to extend into a metal cylinder having a diameter of 240 mm to reach a plasma region, the length of the antenna cannot exceed 240 mm, and the width of the antenna can be set according to actual needs. The feed waveguide 1, the brim 2, the sub-waveguide 4 and the metal base 3 are made of, but not limited to, copper, aluminum, iron, or stainless steel. The sub-waveguide 4 and the metal base 3 may be integrally machined and manufactured.

In accordance with the embodiment, the top surface wave antenna of the spherical tokamak and a peripheral antenna supplement each other and work together. One port is used for the input of microwaves, the other port is used for the output of microwaves. The antenna generates plasmas through saw teeth, slots and radiation energy, and is mainly used in a high-average-power microwave system, especially low-hybrid wave driving of the Tokamak, where the thickness of the sub-waveguide 4, the depth of the radiation slot 5 and the height of the step supplement each other to jointly determine the performance, the reflection coefficient, the field intensity distribution, the parallel refractive index and the like of the antenna. The antenna, after being machined and molded, is debugged to achieve the engineering requirement, with an excellent experimental test result.

Figure 4:
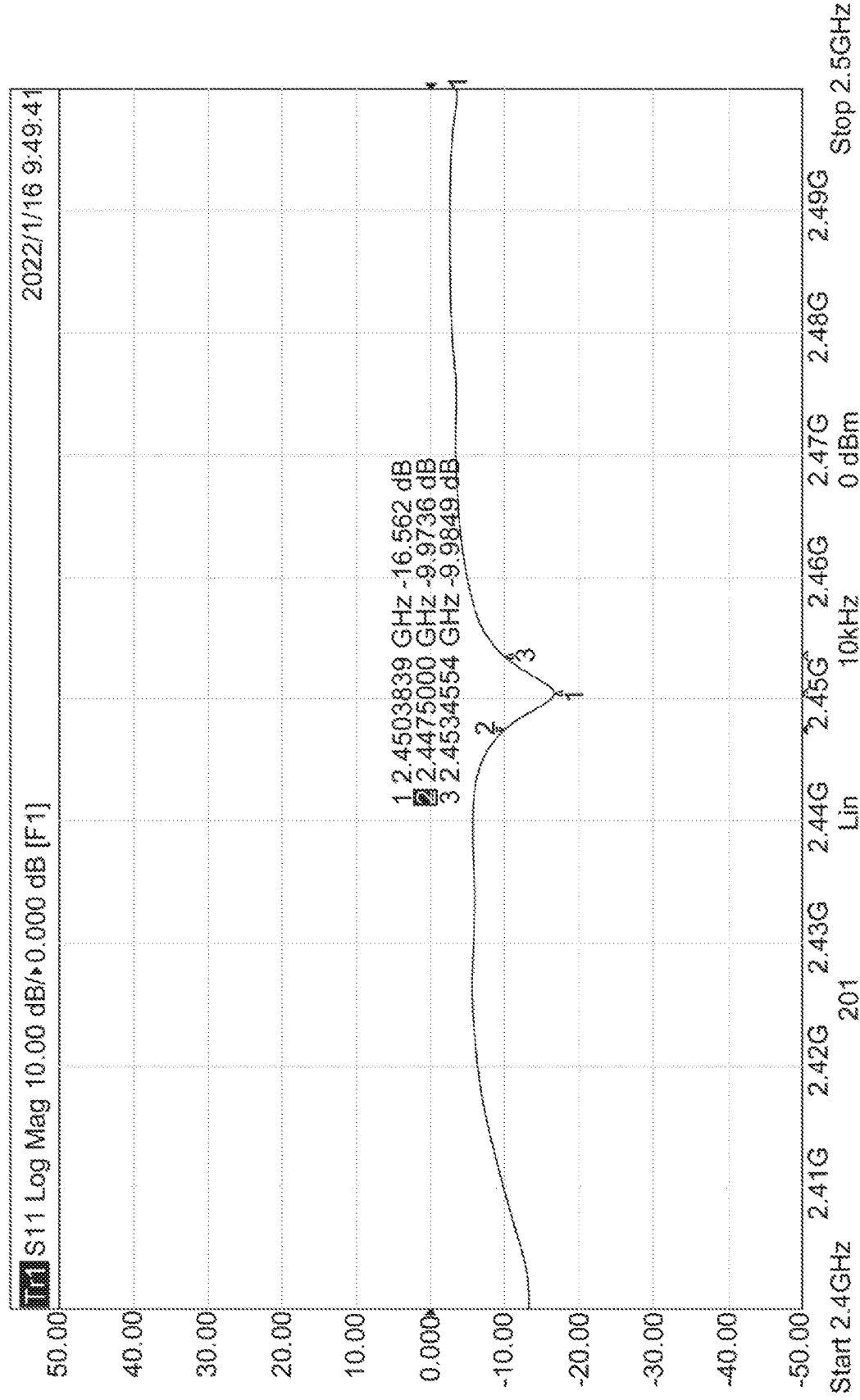
FIG. 4 is an actual testing diagram of reflection coefficients of a top surface wave antenna of a spherical Tokamak of in accordance with the present disclosure.
Figure 5:
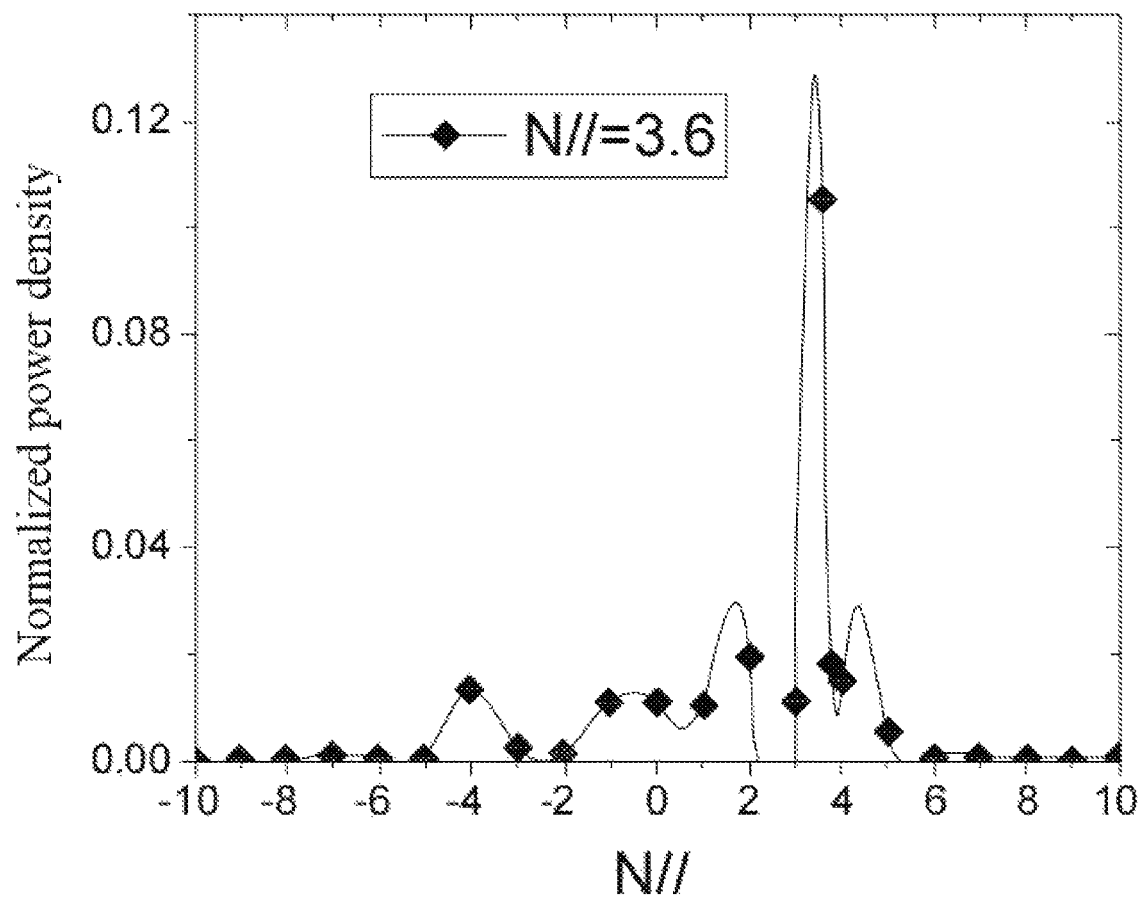
FIG. 5 is a diagram of parallel refractive indexes of a top surface wave antenna of a spherical Tokamak in accordance with the present disclosure.

As shown in FIG. 4, an actual testing diagram of reflection coefficients of an antenna in accordance with the present disclosure is provided. The testing result may vary slightly with the change of the machining materials (gold, silver, copper, aluminum, stainless steel and the like). The antenna has a central operating frequency of 2.45 GHz, $S_{11}$ (reflection coefficient) at the point is equal to −17 dB, about 99% microwave energy is radiated into the air, less than 1% of the energy is reflected back from the port of the feeder waveguide 1, and the microwave bandwidth is 6 MHz. As shown in FIG. 5, a diagram illustrating parallel refractive indexes of an antenna in accordance with the present disclosure is provided. The antenna has a central operating frequency of 2.45 GHz, $n_{11}$ (parallel refractive index) at the point is equal to 3.6, and the parallel refractive rate $n_{11}$ related to the antenna is equal to 0 to 100. It is shown in the figure that the top surface wave antenna is excellent in directivity.

Several examples are used for illustration of the principles and implementation methods of the present disclosure. The description of the embodiments is merely used to help illustrate the method and its core principles of the present disclosure. In addition, a person of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. A top surface wave antenna of a spherical Tokamak, comprising a feed waveguide, a brim, sub-waveguides, and a metal base, wherein the lower end of the feed waveguide is connected to one end of the metal base, and one side of the feed waveguide is connected to the brim; the brim is towards a length direction of the metal base; a plurality of sub-waveguides are arranged on the metal base at equal intervals, the tops of the sub-waveguides are not higher than the height of the metal base, and the sub-waveguides are arranged in a rising line trend; and the feed waveguide serves as a microwave input port;

wherein, the brim is an inverted U shape, the top surface of the brim is flush with the top surface of the feed waveguide, two side surfaces of the brim are right triangles, and the two side surfaces of the brim are connected to the side wall of the feed waveguide.

2. The top surface wave antenna of the spherical Tokamak according to claim 1, wherein a through opening of the feed waveguide is rectangular, the top surface of the feed waveguide is flush with the top end of the metal base, and an initial height of the sub-waveguide is not higher than the bottom surface of the feed waveguide.

3. The top surface wave antenna of the spherical Tokamak according to claim 1, wherein two platforms and two sections of steps are arranged on the metal base, a first platform, a first section of steps, a second platform and a second section of steps are connected in sequence; the sub-waveguides arranged on the first platform, the first section of steps and the second platform have the same height, and the top ends of the sub-waveguides on the second section of steps are flush with the top ends of the sub-waveguides on the second platform; each step on the first section of steps and the second section of steps have a height of 0 mm to 100 mm, and radiation slots formed in the first platform, the first section of steps and the second platform each have a depth of 0 mm to 100 mm.

4. The top surface wave antenna of the spherical Tokamak according to claim 3, wherein each step of the first section of steps has a height of 3.38 mm, and each step of the second section of steps has a height of 5 mm.

5. The top surface wave antenna of the spherical Tokamak according to claim 3, wherein the radiation slot between the adjacent sub-waveguides has a width of 0 mm to 100 mm, and the radiation slots formed in the first platform, the first section of steps and the second platform each have a depth of 27 mm to 28 mm.

6. The top surface wave antenna of the spherical Tokamak according to claim 1, wherein the number of the sub-waveguides is 0 to 100, and the sub-waveguides each have a thickness of 0 mm to 100 mm and a height of 0 mm to 100 mm.

7. The top surface wave antenna of the spherical Tokamak according to claim 6, wherein the number of the sub-waveguides is 27, the sub-waveguides each have a thickness of 5 mm, and a spacing distance between the adjacent sub-waveguides is 5 mm.

8. The top surface wave antenna of the spherical Tokamak according to claim 1, wherein the total length of the feed waveguide and the metal base is not greater than 240 mm, and the top surface wave antenna has a parallel refractive index $n_{11}$ of 0 to 100.

9. The top surface wave antenna of the spherical Tokamak according to claim 1, wherein the feed waveguide, the brim, the sub-waveguide and the metal base are made of copper, aluminum, iron, or stainless steel.

* * * * *